3,423,144
KNIFE HOLDERS
James M. Patterson, 811 6th Ave.,
Albany, Ga. 31705
Filed Aug. 9, 1966, Ser. No. 571,245
U.S. Cl. 312—280                                         7 Claims
Int. Cl. A47b 77/14, 96/18

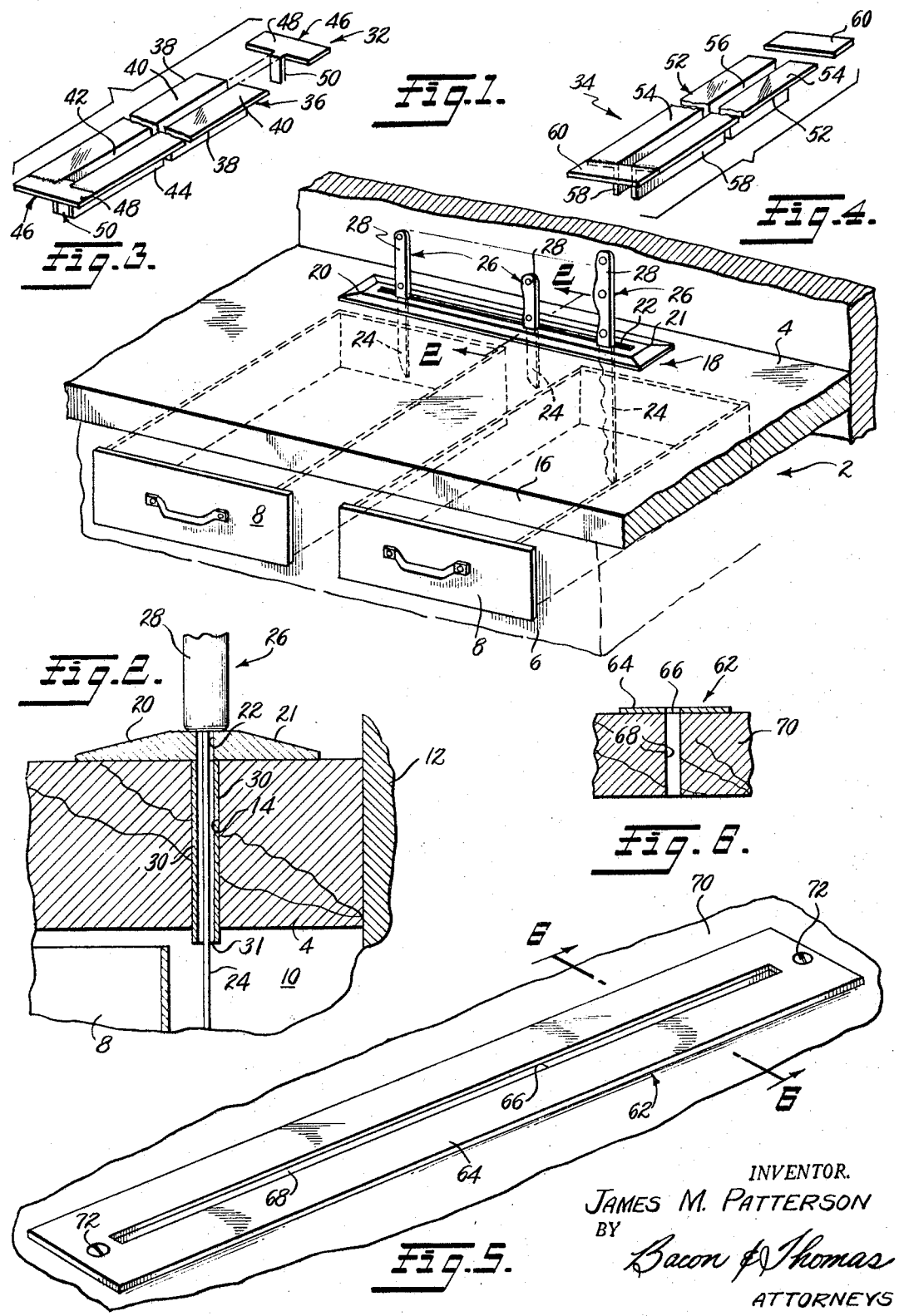

ABSTRACT OF THE DISCLOSURE

Knife holder with elongated slot and depending flanges along slot and made of angle-shaped material. The knife holder may be frictionally retained in a slot in a counter top or the like by the depending flanges, or may otherwise be detachably secured in place for ready removal and cleaning. The knife holder is combined with a counter top supported by a cabinet containing slidable drawers with the knife holder installed at a location beyond the inner end of the sliding drawers.

---

This invention relates generally to holders for knives and more particularly, to several improved knife holder arrangements for storing a plurality of knives of different sizes in an upright position with the handles uppermost, so that the handles can be easily grasped to remove the knives from the holders when desired.

The knife holders of the present invention are intended to be mounted on a counter top, or the like, above an opening made therein, and when a knife is inserted into the holder, the blade thereof will project vertically downward through the opening. The blade of a knife mounted in the holder is thus concealed by the counter top, while the knife handle conveniently projects above the counter top. Since only the knife handles will be visible, an uncluttered appearance is presented, and the disposition of the knife blades below the counter top minimizes the danger hazard that might otherwise be presented by the blades.

A feature of the invention is the use of any one of the present knife holders with a drawer type cabinet having a counter top in which an elongated opening is located in an area rearwardly of the sliding drawers and extends generally parallel to the front of the cabinet. The knife holder is mounted over and/or partially in this opening, depending upon its construction, and the blades of knives inserted therein are thus not only concealed by the cabinet, but are positioned so as not to interfere with the sliding of the drawers. Moreover, the location of the knife holder at the rear of the counter top discourages small children from removing knives therefrom because of inaccessibility.

The principal object of the invention is to provide a knife holder for readily receiving a plurality of knives of different sizes, and which positions the handles of knives held thereby upright, so that they can be easily grasped and removed from the holder.

A further object is to provide a knife holder that is designed to be removably mounted on a counter top so that it can be easily removed for cleaning and then replaced.

It is also an important object to provide a knife holder and drawer-type cabinet combination, wherein a counter top on the cabinet has a long opening rearwardly of the cabinet drawers and with which the present knife holder is associated, whereby a plurality of knives can be held with their blades received behind the sliding cabinet drawers and concealed by the cabinet structure.

Another object is to provide a knife holder that can be easily manufactured at low cost, and that can be readily installed wherever desired.

Other objects and many of the attendant advantages of the invention will become readily apparent from the following detailed description, when taken in conjunction with the accompanying drawings, wherein:

FIG. 1 is a fragmentary perspective view showing a preferred embodiment of the knife holder frictionally mounted in an opening in the counter top of a drawer type cabinet, rearwardly of the inner ends of the sliding drawers, a plurality of knives being shown received in the holder;

FIG. 2 is an enlarged vertical sectional view taken along the line 2—2 of FIG. 1, showing the downwardly depending flanges or "thimble" on the holder that frictionally engage the walls of the counter top opening to secure the knife holder in position while permitting ready removal thereof;

FIG. 3 is an exploded perspective view of a second form of knife holder, wherein depending flanges on the holder are formed integrally with the horizontal portions thereof;

FIG. 4 is an exploded perspective view showing a third form of the type of knife holder of FIGS. 1 and 2;

FIG. 5 is a perspective view of a fourth embodiment of the knife holder shown detachably mounted over an elongated opening in a counter top; and FIG. 6 is a vertical sectional view taken along the line 6—6 of FIG. 5.

Referring now to FIGS. 1 and 2, there is shown a kitchen cabinet 2 having a counter top 4, a front wall 6, and a plurality of drawers 8 slidably mounted in the cabinet. The counter top 4 has a width substantially greater than the length of the drawers 8 to provide a space 10 between the inner end of the drawers and the rear wall 12 of the cabinet 2. The counter top 4 has an elongated opening 14 positioned between the inner end of the drawers 8 and the wall 12, and opening into the space 10. The opening 14 extends generally parallel to both the front edge 16 of the counter top 4 and the front wall 6 of the cabinet 2.

Removably mounted on the counter top 4 is a first embodiment 18 of the knife holder of the present invention. The knife holder 18 includes a unitary, generally rectangular plate 20 having a centrally positioned elongated slot 22 extending nearly the full length thereof. The elongated slot 22 is closed at its ends and is uninterrupted throughout its length, so that the blades 24 of knives 26 can be inserted wherever desired along the length thereof, each knife 26 having a handle 28 substantially thicker than its blade 24. The slot 22 has a width slightly greater than the thickness of the knife blades 24 to be received therein, but substantially less than the thickness of the knife handles 28. The length of the plate 20 and its slot 22 can be varied to suit a particular cabinet design, or as desired.

While the plate 20 is shown to have a plain rectangular configuration, it is to be understood that alternatively, the corners of the plate 20 can be rounded, its edges beveled, as at 21, or scalloped, its surface ornamented, or other changes made without departing from the invention. The plate 20 is positioned over the opening 14 with the elongated slot 22 aligned with the opening 14, and is detachably secured in position by a rectangular thimble comprising a pair of downwardly extending parallel side flanges 30 and end flanges 31, depending from and secured to the undersurface of the plate 20, as by welding or brazing, and which frictionally engage the adjacent walls of the opening 14. The inner faces of the flanges 30 are spaced apart about the same distance as the width of the elongated slot 22. The counter top opening 14 is cut so that the side walls thereof are generally parallel and are spaced apart a distance almost equal to the distance measured between the outer faces of the flanges 30. Thus, a tight frictional fit is obtained between the outer surface of the flanges 30 and the confronting side walls of the opening 14 to removably secure the knife holder 18 in position, but allowing easy removal for cleaning.

The flanges 30 and 31 are formed separately from the plate 20, but may be formed integral therewith, as by die casting. Preferably, the flanges 30 constitute the side walls of a circumferentially continuous thimble, in which said side walls are connected together at their opposite ends by the end walls 31. If desired, however, the end walls 31 can be omitted, to enable some flexing of the side walls 30 to make it easier to assure a tight fit in the opening 14.

After the plate 20 is secured in position, the knife holder 18 is ready to receive the knives 26. The blade 24 of each knife 26 is inserted through the elongated slot 22 at any desired location along the length thereof, and the knife is then lowered until the lower end of its handle 28 rests on the edges of the plate 20 at the opposite sides of the slot 22. The weight of the knife blade 24 is effective to hold the knife erect in th holder 18, so that the handle 28 thereof can be easily grasped. The knife blade 24 is received in the space 10 between the inner end of the drawers 8 and the wall 12 and is concealed by the counter top 4 and the rest of the cabinet structure. The knives, being positioned in the holder 18 at the rear of the counter top 4, do not interfere with the movement of the sliding drawers 8.

Modifications of the knife holder 18 are shown at 32 and 34 in FIGS. 3 and 4, respectively. The knife holder 32 is fabricated from angle sections that are welded or brazed together, and includes an assembly 36 comprising a pair of angle members 38 having horizontal flanges 40 that extend parallel, and which are spaced apart to define a slot 42 corresponding to the slot 22 in FIGS. 1 and 2. The vertical flanges 44 on the angle members 38 extend downwardly from the horizontal flanges 40 along the inner edge thereof, and correspond to the flanges 30 in FIGS. 1 and 2.

The angle members 38 are held in spaced, parallel relationship by bridging members 46 welded or brazed to the opposite ends thereof, the members 46 each being made from a length of angle material and including a horizontal plate portion 48 having a length equal to the combined widths of the flanges 40 and the width of the slot 42. The vertical flange 44 on each of the members 46 is cut away on the opposite ends thereof for a distance equal to the width of the flange 40, leaving an integral, centrally disposed vertical spaced flange 50 that is received between the ends of the vertical flanges 44. The width of the spacer flange 50 corresponds to the width of the slot 42, and the flanges 50, when secured to the vertical flanges 44, define therewith a circumferentially continuous thimble for tight frictional insertion into a counter top opening of suitable size.

The knife holder 32 of FIG. 3 functions identically to the knife holder 18, the blades of knives to be held by said holder being inserted into the slot 42. The thimble formed by the downwardly depending flanges 44 and the spacer flanges 50 functions to frictionally engage the walls of a counter top opening into which the thimble is inserted, to detachably secure the holder 32 in position.

The knife holder 34, FIG. 4, includes a pair of longitudinally extending angle members 52 identical to the members 38, the horizontal flanges 54 thereof being spaced apart to define an uninterrupted elongated slot 56 for receiving knives. Integrally formed vertical flanges 58 extend downwardly from the inner edge of the horizontal flanges 54, and function like the flanges 44 and 30 to frictionally secure the knife holder 34 in position.

The opposite ends of the angle members 52 are secured together by end plates 60, each having a length corresponding to the combined width of the horizontal flanges 54 and the width of the slot 56. The plates 60 are welded or brazed to the opposite ends of the horizontal flanges 54, and secure the angle members 52 in spaced, parallel relationship.

The angle members of FIGS. 3 and 4 may be made of aluminum or brass and finished with a high polish, and ornamented, if desired, to present an attractive appearance.

Another embodiment of the knife holder of the invention is shown at 62 in FIGS. 5 and 6, wherein the downwardly extending parallel flanges are eliminated. Referring to FIG. 5, the holder 62 comprises a plate 64 having an uninterrupted elongated slot 66 therein. The plate 64 is adapted to be installed over an elongated opening 68 in a counter top 70, and to be detachably secured to said counter top by screws 72 received through holes provided in the plate 64 outwardly of the ends of the slot 66. The holder 62 functions like the holders 18, 32 and 34 to receive and hold knives.

The elongated slot 66 in FIGS. 5 and 6 is substantially coextensive with the elongated opening 68, an arrangement that makes it possible for the opening 68 to receive and support knives in the absence of the holder 62. With the knife holder 62 removed, the lower end of the handle on a knife inserted into the elongated opening 68 would rest directly on the top edges of said opening.

The elongated opening 14 in FIGS. 1 and 2 can also be sized so that knives can be received and supported in the absence of a knife holder mounted on the counter top. In this instance the width of the elongated opening 14 would be selected to be slightly greater than the thickness of the knife blades 24, but substantially less than the thickness of the lower end of the handles 28. In the absence of the holder 18, the lower end of the handles 28 on knives 26 inserted into such an elongated opening would rest directly on the counter top.

Obviously, many modifications and variations of the present invention are possible in the light of the above teachings. It is, therefore, to be understood that within the scope of the appended claims, the invention may be practiced otherwise than as specifically shown and described.

I claim:

1. In combination: a drawer cabinet including a front wall having a plurality of drawers slidably mounted therein; a counter top on said drawer cabinet, said counter top having a greater width than the length of said drawers, whereby to define a counter top strip of substantial width disposed rearwardly of said drawers when said drawers are fully closed, said counter top strip having an elongated opening therein disposed rearwardly of the inner end of said fully closed drawers and extending parallel to said cabinet front wall, said elongated opening being adapted to receive the blades of a plurality of knives of the type having a blade and a handle mounted on one end of said blade with the lower end of said handle being substantially thicker than said blade, and said elongated opening having a width slightly greater than the thickness of the blade of a knife to be received therein and substantially less than the thickness of the lower end of the handle of said knife, whereby said elongated opening is adapted to receive and hold knives having blades substantially longer than the depth of the topmost of said drawers, without interfering with normal drawer operation.

2. The combination as recited in claim 1, including additionally: a knife holder mounted on said counter top over said elongated opening in said counter top strip, said holder comprising a plate portion having an elongated slot therein that is substantially coextensive with said elongated opening; and means detachably securing said holder to said counter top.

3. The combination as recited in claim 2, wherein the detachable securing means comprises a pair of spaced, downwardly extending flanges forming continuations of the slot carried by the plate portion and being frictionally engaged at their outer faces with opposed walls of the elongated opening in said counter top strip.

4. The combination as recited in claim 2, wherein said plate portion comprises a pair of spaced, parallel horizontal flanges connected at their opposite ends by horizontal end plates, said detachable securing means comprising integral downwardly extending flanges at the inner edge of said horizontal flanges, said downwardly extending flanges being frictionally engaged at their outer faces with opposed walls of the elongated opening in said counter top strip.

5. A holder as recited in claim 3, wherein the opposite ends of the flanges are connected by end walls to form a circumferentially continuous thimble.

6. A holder as recited in claim 4, wherein the end plates have downwardly extending spacer flanges formed integrally therewith, said spacer flanges being received between the ends of said downwardly extending flanges and being secured thereto, whereby said downwardly extending flanges and said spacer flanges form a circumferentially continuous thimble.

7. A holder as recited in claim 6, wherein the horizontal flanges and the end plates comprise portions of angle members.

References Cited
UNITED STATES PATENTS

| | | |
|---|---|---|
| 471,752 | 3/1892 | Russell. |
| 551,316 | 12/1895 | Hutchinson. |
| 1,008,835 | 11/1911 | Lichtenstine _ _ _ _ _ _ 312—280 X |
| 1,392,134 | 9/1921 | Farber _ _ _ _ _ _ _ _ _ _ _ _ _ _ 211—60 |
| 1,739,900 | 12/1929 | Giambra _ _ _ _ _ _ _ _ 232—43.4 X |
| 1,742,102 | 12/1929 | Seagles _ _ _ _ _ _ _ _ _ _ _ 211—69 X |
| 1,746,503 | 2/1930 | Timmons _ _ _ _ _ _ _ _ _ _ 211—60 X |
| 2,215,923 | 9/1940 | Goodwin. |
| 2,322,797 | 6/1943 | Fishel _ _ _ _ _ _ _ _ _ _ _ _ _ _ 211—69 |
| 2,899,077 | 8/1959 | Timms _ _ _ _ _ _ _ _ _ _ _ _ _ 211—60 |

CHANCELLOR E. HARRIS, *Primary Examiner.*

ABRAHAM M. FRANKEL, *Assistant Examiner.*

U.S. Cl. X.R.

211—60